US006517930B2

(12) United States Patent
Kimura

(10) Patent No.: US 6,517,930 B2
(45) Date of Patent: Feb. 11, 2003

(54) DECORATIVE LIGHT-TRANSMITTANCE SHEET TYPE KEY TOP

(75) Inventor: Toru Kimura, Tokyo (JP)

(73) Assignee: Polymatech Co., Ltd. (JP)

( * ) Notice: Subject to any disclaimer, the term of this patent is extended or adjusted under 35 U.S.C. 154(b) by 41 days.

(21) Appl. No.: 09/731,064

(22) Filed: Dec. 6, 2000

(65) Prior Publication Data

US 2002/0022113 A1 Feb. 21, 2002

(30) Foreign Application Priority Data

Dec. 13, 1999 (JP) .......................................... 11-352918

(51) Int. Cl.$^{7}$ ............................ B32B 27/14; B32B 3/00

(52) U.S. Cl. ....................... 428/195; 428/336; 428/688; 428/698; 428/702

(58) Field of Search ................................ 428/174, 195, 428/215, 688, 702, 698, 336, 332; 427/248.1

(56) References Cited

U.S. PATENT DOCUMENTS 4,937,408 A * 6/1990 Hattori et al. .............. 200/314
5,527,596 A * 6/1996 Kimock et al. ............. 428/216
6,322,875 B1 * 11/2001 Kimura ...................... 428/195

FOREIGN PATENT DOCUMENTS

| | | |
|---|---|---|
| JP | 9-111741 | 10/1998 |
| JP | 10-73076 | 9/1999 |
| JP | 10-130838 | 11/1999 |

* cited by examiner

*Primary Examiner*—Harold Pyon
*Assistant Examiner*—Catherine A. Simone
(74) *Attorney, Agent, or Firm*—McGlew and Tuttle, P.C.

(57) ABSTRACT

A decorative light-transmittance sheet type key top of a pushbutton that presents an uniform, massive and brilliant luster, to not take much working time in production, and to aim at a simplification of the work process, which is integrally formed with a transmittance plastic film curved according to the shape of a top face side of the key top body, a decorative transmittance key top is constituted to reflect selectively light with a given wavelength and present transmittance brilliant color by providing cholesteric liquid crystal layer made of liquid crystal polymer on a surface side and/or the back side of the film.

10 Claims, 3 Drawing Sheets

DECORATIVE LIGHT-TRANSMITTANCE SHEET TYPE KEY TOP

DETAILED DESCRIPTIONS OF THE INVENTION

1. Industrial Field of the Invention

The present invention relates to a decorative light-transmittance sheet type key top using for a portable telephone, a portable information terminal, remote controllers for various home electric appliances, a card remote controller and various types of keyboards, which are excellent in beauty and have high-class sense, and manufacturing methods thereof.

2. Prior Art

In recent years, a sheet type key top of a push button has been used for a portable telephone or a remote controller which has been made compact and light weight. The sheet type key top is integrally formed with a transmittance plastic film which is curved according to a shape of a top face side of a key top body on the top face side of the key top body made of polymer resin molded as a thin and light weight switch.

Moreover, as the design variation of a portable telephone or a switch of a remote controller, ones having metallic luster or pearl luster have become required. As a method for decorating a key top part of a pushbutton switch with metallic luster or pearl luster, conventionally a method by which a metal powder or a pearl pigment is mixed and molded with resin or rubber component, a method by which a paint containing metallic powder or a pearl pigment is screen-printed or spray-coated, a method by which a thin metal film made of aluminum, chrome or the like is provided on a surface of a key top by vacuum deposition or spattering, a method using plating and the like are known.

Problems to be Solved by the Invention

However, since in the conventional method of mixing and molding metal powder or pearl pigment with resin or rubber uniform dispersion of the powder is difficult, there are problems that segregation of powder causes stripes or unevenness in color tone and make characters and symbols illegible. Moreover, in the method which prints a paint containing metallic powder or pearl pigment, a decorative key top having uniform and highly massive luster can not realize.

On the other hand, a key top that can obtain by vacuum-depositing, spattering or plating a metal thin film made of aluminum, chrome or the like on the surface of the molding body presents metallic luster, but is not light-transmittance one having brilliant luster.

Further, the decorative key top that selectively reflects rays with a given wavelength and presents brilliant luster can be obtained by laminating films of metal oxides, such as titanium oxide, tungsten oxide, silicon oxide and the like, using the methods described in Japanese Patent Application No. H09-111741, H10-73076 and H10-130838. However, since films are formed by batch production, there are problems such that its production takes a considerable working time and the film-formation requires complicated jigs.

For the resin key top of the recent portable telephone, portable terminal equipment, remote controller for various types of home electric appliances, card remote controller and various types of keyboards, there are increasing needs for ones having brilliant luster, excellent beauty and high-class sense.

Means to Solve the Problems

It is, therefore, an object of the present invention to solve the above problems, to provide a decorative light-transmittance sheet type key top that presents an uniform, massive and brilliant luster, to not take much working time in production, and to aim at a simplification of the work process and manufacturing methods thereof.

That is, in a sheet type key top of a pushbutton which is integrally formed with a transmittance plastic film curved according to the shape of a top face side of the key top body on the top face of the key top body made by molded polymer body, a decorative transmittance key top is constituted to reflect selectively light with a given wavelength and present transmittance brilliant color by providing cholesteric liquid crystal layer made of liquid crystal polymer on a surface side and/or the back side of the film.

Further, the decorative light-transmittance key top is characterized that the liquid crystal polymer forming the cholesteric liquid crystal layer is optically active polyester containing as a component hydrocarbon unit selected from aromatic unit having as a substituent hydrocarbon of at least carbon number 3 to 8 and/or halogen, polynuclear hydrocarbon unit and ortho-substituted aromatic unit.

Furthermore, a manufacturing method of a decorative light-transmittance key top comprises the steps of applying rubbing processing on the surface or back face of a light-transmittance plastic film, providing, a cholesteric liquid crystal layer which is applied and oriented with liquid crystal polymer on the processed surface, and integrally molding the light-transmittance plastic film with polymer resin in a die.

More, a manufacturing method of the decorative light-transmittance key top comprises the steps of applying rubbing processing on the surface and/or back face of a sheet type key top in which a light-transmittance plastic film curved according to the shape of a top face side of the key top body is formed integrally with the top face side of the key top body made of polymer resin, and then forming a cholesteric liquid crystal layer by applying and orienting with a liquid crystal polymer.

DETAILED DESCRIPTION OF THE PREFERRED EMBODIMENTS

The present invention is described in more detail below.

The present invention is constituted so as to present light-transmittance brilliant colors that selectively reflect ray with a given wavelength by providing a cholesteric liquid crystal layer on a surface/back face or both faces of a film composing a sheet type key top or a surface/back face or both of the sheet type key top.

Moreover, optionally shaped parts without cholesteric liquid crystal reflecting, such as characters, symbols and the like, may be formed by erasing an orientation of the cholesteric liquid layer by applying laser beam, such as a YAG laser, $CO_2$ laser and the like to a part of the cholesteric liquid crystal layer of the present invention.

The liquid crystal polymer forming the cholesteric liquid crystal layer of the present invention, when the total light transmittance is below 70%, becomes in sufficient in light transmission and make it difficult to identify, from the surface of the sheet type key top, the characters and symbols printed at a bottom side. A preferable total light transmittance is 75% or more, and more preferably 80% or more. Incidentally the total light transmittance means a measurement value conforming to JIS K7105.

The liquid crystal polymer forming the cholesteric liquid crystal layer of the present invention preferably is formed a cholesteric liquid crystal layer of monodomain structure with a unit layer thickness of 50 nm to 300 nm. A center wavelength of beam selectively reflected in the obtained decorative key top is dependent on a thickness of one layer. Further, the selective light reflection of the obtained decorative key top, the number of layers preferably is 5 to 50 and a total layer thickness of 250 nm to 15000 nm in preferable in total thickness. Total layer thickness out side the 250 to 15000 nm range is not preferable, because the brilliant luster is thinned when thinner than 250 nm and the light transmission is degraded when 15000 nm is exceeded. Although the result depends on the type, refraction and shape of the resin used, and the material, refraction and color tone of the liquid crystal polymer, in the range of the total thickness 500 nm to 5000 nm the selective reflection of rays with a given wavelength is high, and excellent beauty one having brilliant luster of main color of red, yellow, blue, violet and the like can be obtained.

For the liquid crystal polymer forming the cholesteric liquid crystal layer of the present invention can be used all those which are liquid crystal state at high temperatures and glassy state at temperatures below the liquid crystal transition point, and for example, principal chain type liquid crystal polymers, such as polyester, polyamide, polycarbonate, polyesterimide and the like, and side chain type liquid crystal polymers, such as polyacrylate, polysiloxane and the like can be listed. Above all, polyester is preferable because of ease of synthesis, clarity, orientation, glass transition point and the like.

Although the composition, type, elastic modulus and color tone of the light-transmittance plastic film of the present invention is not particularly limited, thermoplastic films having favorable clarity, such as polyester, polyolefin, polystyrene, polyurethane, polyamide, silicone, 1,2-polybutadiene, polyethylene vinyl acetate, polyvinyl chloride, polyvinyl alcohol and the like, or polyamide films, polyethylene telephthalate films, polypropylene films, polycarbonate films, or cellophane films are particularly favorable.

Although the composition, type, elastic modulus and color tone of the polymer resin forming the key top body of the present invention is not particularly limited, materials having favorable clarity, such as polymethyl methacrylate, polycarbonate, silicon resin, amorphous polyester, polyvinyl chloride, polystyrene, polyacrylate, amorphous polyolefin, polymethylpentene, amorphous nylon, polyurethane, ester type thermoplastic elastomer, and styrene type thermoplastic elastomer are particularly favorable. A crystal polyester, such as polyethylene, polypropylene, ABS resin, PET and PBT, or a translucent or slightly tinted resin of crystal nylon, polyphenylene ether, polyacetal, polysulfone, polyether sulfone, polyphenylene sulfide, polyimide, polyether, polyketone, polyether ketone, polyether ether ketone, polyether ntrile, polyetherimde, liquid crystal polymer, fluororesin and the like may also be used. It is also possible to use well-known thermosetting, photosetting or moisture setting resin, such as silicon resin, epoxy resin, phenol resin, unsaturated polyester, di-allylphthalate, acrylic resin, urethane resin and the like.

Moreover, since the smoothness of the key top surface as a base is improved when unhardened liquid resin is applied on a molded sheet type key top to form a hardened base coat layer and a cholesteric liquid crystal layer with liquid crystal polymer is formed by rubbing-processing the surface, according to the present invention can be obtained a light-transmittance sheet type key top that presents particularly beautiful brilliant luster. As liquid resin for the base coat of the present invention, thermo-setting, photo-setting or moisture setting resins, such as acrylic resin, urethane resin, silicon resin, epoxy resin, di-allylphthalate, and the like can be listed.

Furthermore, according to the present invention can be made the brilliant-colored liquid crystal polymer stable physically and chemically by laminating unhardened liquid resin on the formed cholesteric liquid crystal layer to form a 5 μm to 60 μm thick polymer protective layer.

The polymer protective layer of the present invention may be colorless, but since the tone varies when a colored one, such as red, blue, yellow and so on, is used, optional coloring can also be applied to. If the thickness is smaller than 5 μm, mechanical properties of the polymer protective layer is low and it is not possible to thoroughly protect the liquid crystal polymer. On the other hand, if the thickness is larger than 60 μm, vividness of the brilliant luster is weakened and the beauty is spoiled.

A more preferable thickness of the polymer protective layer is in a range of 10 μm to 40 μm. Although the polymer protective layer of the present invention does not specify the type of resin, thermosetting, photo-setting or moisture setting monomers or oligomers of acrylic, urethane, silicone, epoxy and ester groups and the like can be listed.

In the method of forming the cholesteric liquid crystal layer of the present invention may be oriented liquid crystal polymer after directly applying on the molded sheet type key top, or the liquid crystal polymer previously applied on a plastic film and then oriented is formed integrally in a die with polymer resin to form a sheet type key top. The method of applying the liquid crystal polymer for forming the cholesteric liquid crystal layer can be not limited to printing methods, such as screen printing, tampo printing, gravure printing, flexo printing and the like, or spraying, dipping, potting and the like.

The method of forming the key top body of the present invention using a die having a desired key top shape comprises the steps of, setting a film which was previously printed with characters, symbols and the like on its surface and/or back face, filling hot-melt resin or liquid unhardened resin from the back side of the film by injection molding, compression molding, transfer molding, rotary molding or the like, and hardening.

The method of forming the base coating layer of the present invention can be not limited to spraying method as well as potting method, dispenser method, pad printing method and transferring method and so on. Moreover, in order to improve adhesion between a base member made of polymer material and the base coat layer, it is preferable that short wavelength ultraviolet irradiation, corona processing, or coupling agent processing and the like is applied on the surface of the base member.

The method of forming the polymer protective layer of the present invention comprises the steps of, coating by a method of spraying, various printing, potting and so on, and hardening by means of heat, light, moisture and the like.

BRIEF DESCRIPTIONS OF THE DRAWINGS

The present invention is described in concrete by showing embodiments and comparisons in the following but the present invention is not limited to these embodiments.

Embodiment 1

Figure 1:
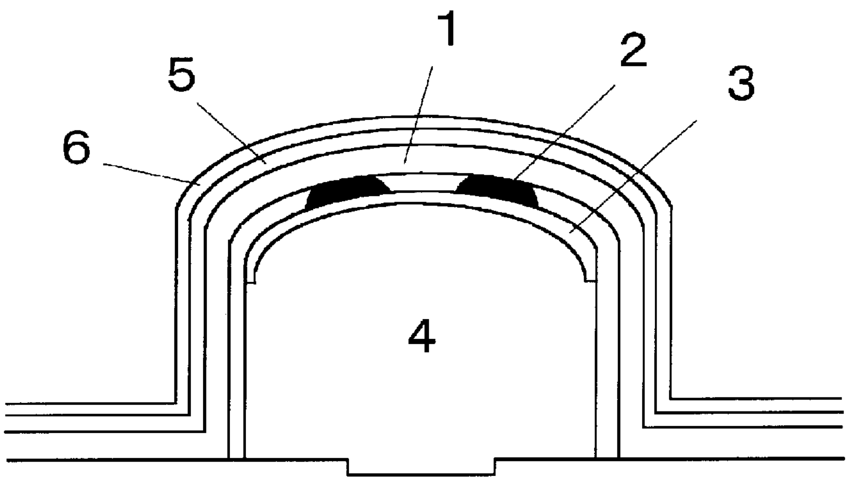
FIG. 1 is a longitudinal view showing the decorative light-transmittance sheet type key top of the first embodiment.

FIG. 1 shows the first embodiment.

A prescribed character or symbol printing layer 2 is screen-printed on the back face of a light-transmittance plastic film made of a marketed 80 μm thick PET. Further, after laminating a reinforcement printing layer 3 on the film, the film is curved according to a desired shape of a top face side of the key top body and held in a die for molding the key top body. Then a key top body 4 is molded filling by injection-molding a polycarbonate resin (PANLITE L1225L, made from Teijin Kasei Co., Ltd.) from the back side of the film.

A base coat layer 5 is formed by applying an acrylic type paint on the surface of the integrally molded sheet type key top to dry. After applying rubbing on the surface of the base coat layer 5, an 8 weight % tetrachloroethane solution of a mixed composition (logarithmic viscosity of base polymer: 0.12, Glass transition: 75° C.) of liquid crystal polymer, separately shown by equation (1), is applied on the surface of the rubbing-processed base coat layer 5 to dry, the processed solution is heat-processed at 150° C. for 150 minutes and cool-hardened to form a 2 μm-thick cholesteric liquid crystal layer 6 that reflects green rays, thereby a decorative light-transmittance sheet type key top is obtained.

Figure 5:
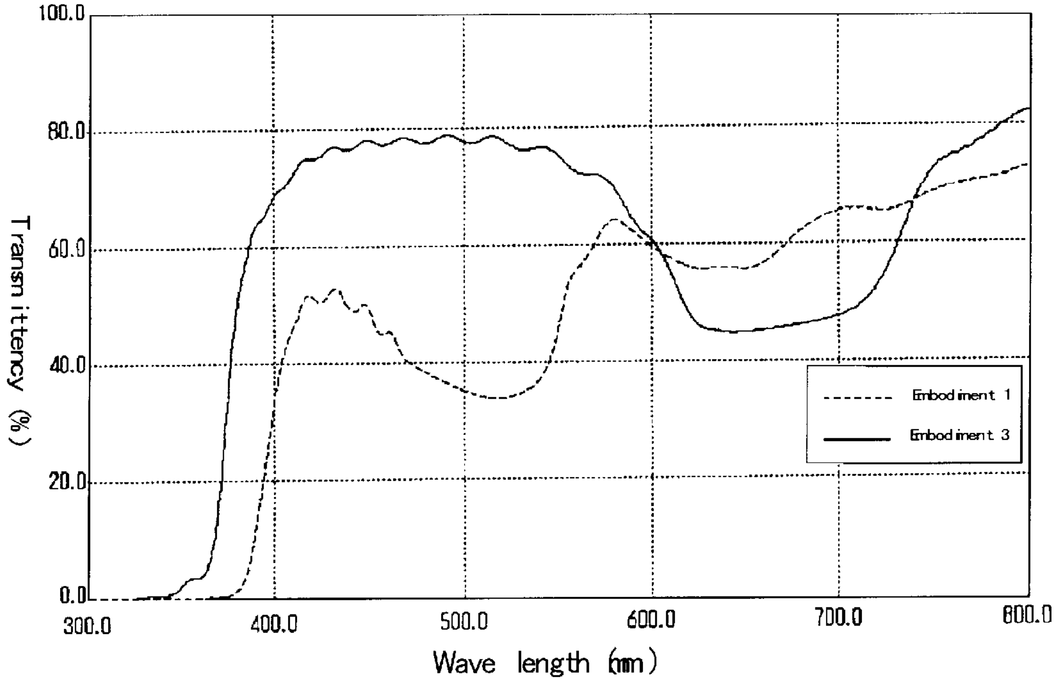
FIG. 5 is an optical spectrum drawing of the visible ray region of the embodiments.

An optical spectrum of the visible ray region of a similar cholesteric liquid crystal layer formed on an 80 μm-thick PET film is shown with a dotted line in FIG. 5.

EQUATION 1

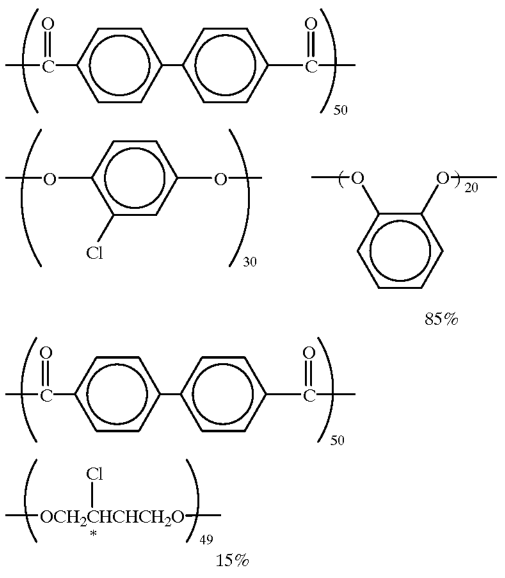

Embodiment 2

Figure 2:
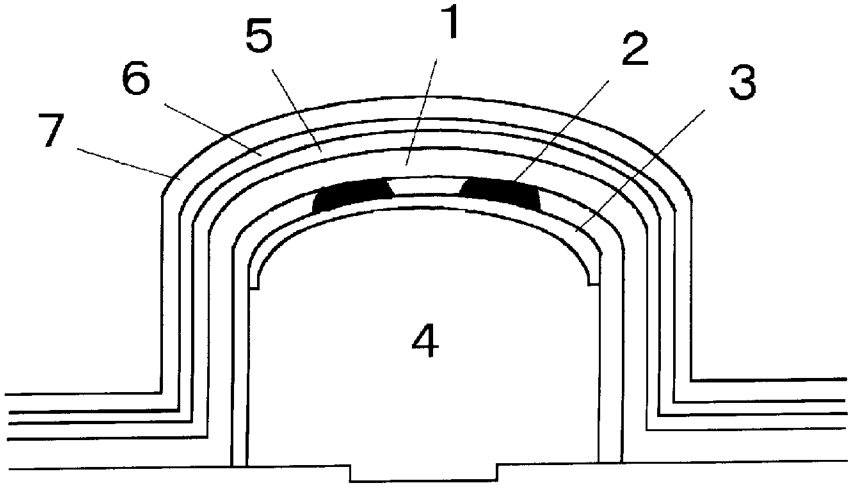
FIG. 2 is a longitudinal view showing the decorative light-transmittance sheet type key top of the second embodiment.

FIG. 2 shows the second embodiment.

The decorative light-transmittance sheet type key top having a brilliant color is coated with violet ray setting type acrylic resin (HO2777U, made by Fujikura Kasei), dry-hardened, and laminated with a 15 μm-thick polymer protective layer 7. By this polymer protective layer, the formed cholesteric liquid crystal layer can be protected.

Embodiment 3

Figure 3:
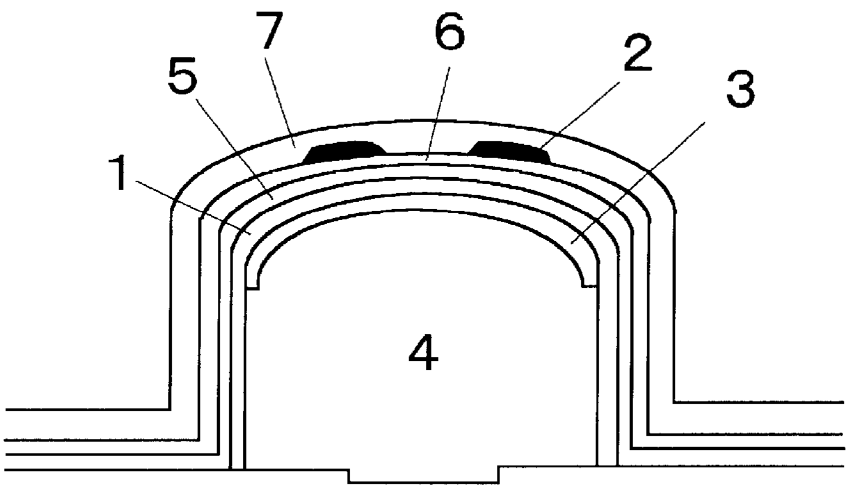
FIG. 3 is a longitudinal view showing the decorative light-transmittance sheet type key top of the third embodiment.

FIG. 3 shows the third embodiment.

A base coat layer 5 is formed by applying an acrylic type paint on the surface of a light-transmittance plastic film 1 made of a marketed 80 μm-thick PET to dry. After applying rubbing on the surface of the base coat layer 5, 8 weight % tetrachloroethane solution of a liquid crystal polymer is applied on the surface of the rubbing-processed base coat layer 5 to dry. Then it is heat-processed at 150° C. for 10 minutes and cool-hardened a 2 μm-thick cholesteric liquid crystal layer that reflects red rays is formed. The optical spectrum of the visible ray region is shown with a solid line in FIG. 5.

A prescribed character or symbol printing layer 2 is screen-printed on the surface of this cholesteric liquid crystal layer, and further an UV acrylic type ink is print-hardened thereon to form a polymer protective layer 7.

Further, after laminating a reinforcement printing layer 3 on the back face of the film, the film is curved according to a desired shape of a top face side of the key top body and held in a die for molding the key top body. A decorative light-transmittance sheet type key top body is molded by filling polycarbonate resin (PANLITE L1225L, of Teijin Kasei Co., Ltd.) from the back side of the film by injection molding. The obtained decorative light-transmittance sheet type key top is excellent in light-transmittance beauty, presenting brilliant luster of main red from portions other than characters and symbols.

Embodiment 4

Figure 4:
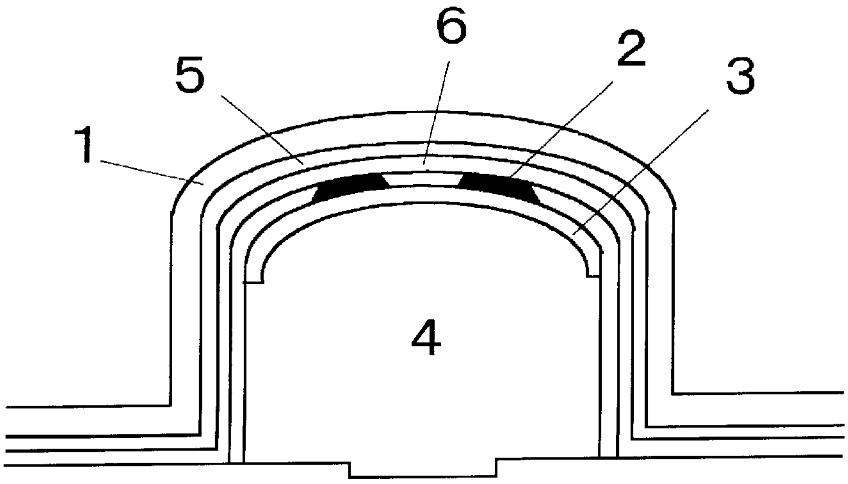
FIG. 4 is a longitudinal view showing the decorative light-transmittance sheet type key top of the fourth embodiment.

FIG. 4 shows the fourth embodiment.

A base coat layer 5 is formed by applying an acrylic type paint on the back face of a light-transmittance plastic film 1 made of marketed 80 μm-thick polycarbonate to dry. After applying rubbing to the base coat layer 5, 8 weight % tetrachloroethane solution of a mixed composition (logarithmic viscosity of base polymer: 0.12, Glass Transition: 75° C.) of liquid crystal polymer, separately shown by equation (1), is applied on the surface of the rubbing-processed base coat layer 5 to dry, it is heat-processed at 150° C. for 10 minutes and cool-hardened to form a 2 μm-thick cholesteric liquid crystal layer 6 that reflects green ray.

A prescribed character or symbol printing layer 2 is screen-printed on this cholesteric liquid crystal layer 6. After laminating a reinforcement printing layer 3 on the character or symbol printing layer 2, it is curved according to a desired shape of the top face side of the key top body and held in a die for molding the key top body. A decorative light-transmittance sheet type key top body 4 is obtained by filling polycarbonate resin (PANLITE L1225L, of Teijin Kasei Co., Ltd.) from the back side of the film by injection molding.

Effects of the Invention

According to the present invention, by laminating on a top face side of a key top body made of polymer resin a cholesteric liquid crystal layer on the surface of a sheet type key top of a pushbutton switch integrally molded with a film curved according to the shape of a top face side of the key top body or on the surface and/or back face of the film, a light-transmittance decorative sheet type key top that is excellent in beauty and has high-class sense, presenting conventionally not obtained brilliant luster mainly of red, yellow, blue, violet and so on, and a manufacturing method thereof can be provided.

What is claimed is:

1. A decorative light-transmittance key top comprising: a key top body made of polymer resin; a sheet type key top of a pushbutton switch, the key top having a light-transmittance plastic film that is curved along a top face side of the key top body, the light-transmittance plastic film being formed integrally with the top face side of the key top body; and a cholesteric liquid crystal layer made of liquid crystal polymer oriented in a cholesteric order, the cholesteric liquid crystal layer being on a surface and/or back face of the plastic film, the decorative light-transmittance key top selectively reflecting light rays with a given wavelength to present light-transmittance and a brilliant color.

2. A decorative light-transmittance key top as claimed in claim 1, wherein the cholesteric liquid crystal layer is made of a liquid crystal polymer which is an optically active polyester containing a hydrocarbon unit selected from the group consisting of an aromatic unit having as a substituent hydrocarbon of carbon number in the range of 3–8, an aromatic unit having halogen as a substituent, a polynuclear hydrocarbon unit and an ortho-substituted aromatic unit.

3. A decorative light-transmittance key top as claimed in claim 1, wherein the liquid crystal polymer forming the cholesteric liquid crystal layer has a total light transmittance of 75% or more.

4. A decorative light-transmittance key top as claimed in claim 2, wherein the liquid crystal polymer forming the cholesteric liquid crystal layer has a total light transmittance of 75% or more.

5. A decorative light-transmittance key top as claimed in claim 3, wherein an undersurface of the cholesteric liquid crystal layer is provided with a character or symbol printing layer.

6. A decorative light-transmittance key top as claimed in claim 4, wherein an undersurface of the cholesteric liquid crystal layer is provided with a character or symbol printing layer.

7. A decorative light-transmittance key top as claimed in claim 1, wherein the cholesteric liquid crystal layer has a total thickness of 500 nm to 5000 nm.

8. A decorative light-transmittance key top as claimed in claim 2, wherein the cholesteric liquid crystal layer has a total thickness of 500 nm to 5000 nm.

9. A decorative light-transmittance key top as claimed in claim 7, wherein the cholesteric liquid crystal layer is composed of a multi-layer structure in which 5 to 50 layers of monodomain structure in a thickness of 50 nm to 300 nm are superposed continuously in a helical form.

10. A decorative light-transmittance key top as claimed in claim 1, wherein the cholesteric liquid crystal layer has portions having no cholesteric liquid crystal reflection, the portions being formed by erasing an orientation of the cholesteric liquid crystal layer by applying a laser beam.

* * * * *